United States Patent

Brown et al.

[11] Patent Number: 5,880,695
[45] Date of Patent: Mar. 9, 1999

[54] ANTENNA SYSTEM FOR WIRELESS COMUNICATION SYSTEMS

[75] Inventors: Glenn F. Brown, Fairfax; Joseph R. Jahoda, Reston, both of Va.

[73] Assignee: Astron Corporation, Sterling, Va.

[21] Appl. No.: 19,082

[22] Filed: Feb. 5, 1998

[51] Int. Cl.$^6$ .................................. H01Q 1/38; H01Q 1/42
[52] U.S. Cl. .................................. 343/700 MS; 343/789; 343/872
[58] Field of Search .......................... 343/700 MS, 789, 343/783, 784, 872; H01Q 1/38, 1/42

[56] References Cited

U.S. PATENT DOCUMENTS 5,625,365  4/1997  Tom et al. ............................. 343/701
5,757,324  5/1998  Helms et al. ..................... 343/700 MS Primary Examiner—Hoanganh Le
Attorney, Agent, or Firm—Hunton & Williams

[57] ABSTRACT

A repeater station having circularly polarized antennas. A diamond panel antenna and a panel antenna are positioned in a back-to-back relationship. Each antenna is circularly polarized. The antennas use "tunnel technology" for isolating the antennas. A chassis forming a recessed portion is provided. A dielectric board is inserted into the recess. Patch elements mounted on a board are inserted into the recess and connected to the dielectric board. The width of the boards are such that a "tunnel" is formed about the periphery thereof. Absorber material is then inserted into the tunnel around the boards. A radome is placed over the recess enclosing the boards and elements.

4 Claims, 3 Drawing Sheets

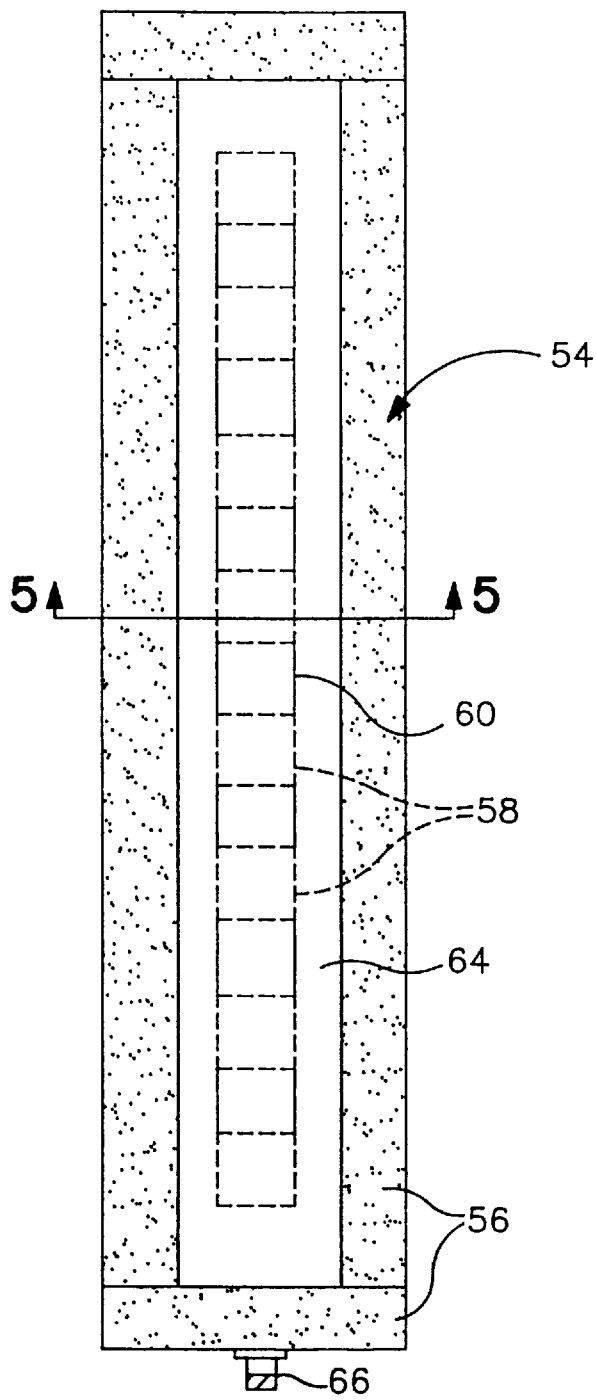
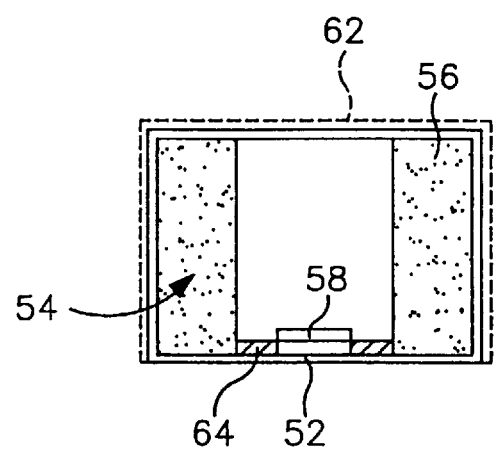
FIG. 4
FIG. 5

ANTENNA SYSTEM FOR WIRELESS COMUNICATION SYSTEMS

FIELD OF THE INVENTION

The invention relates to the use of circularly polarized high front to back ratio antennas to improve isolation and reduce the necessary distance between donor and subscriber antennas in wireless repeater systems. The invention also relates to the improved performance gained by the use of circularly polarized antennas to transmit to and receive from subscriber units that are vertically polarized.

BACKGROUND OF THE INVENTION

The use of repeaters in various types of wireless communications systems (e.g., cellular and PCS) generally is known. Wireless communications systems typically include a base station and one or more fixed or mobile subscriber units.

Repeaters are bi-directional devices which relay signals from a cellular or PCS base station to the mobile or fixed subscriber units and from subscriber units to the base station. The repeater extends the base station signals to provide a stronger signal in areas which have little or no signal. The repeater includes a donor antenna, which relays signals between the repeater and the base station, and a subscriber antenna, which relays signals between the base station and the mobile or fixed subscriber units.

The operation of the repeater is based, in part, on the isolation obtained between a donor/subscriber antenna pair. The greater the isolation, the better the performance. Currently, isolation is obtained by physically separating donor and subscriber antennas either vertically or horizontally. To achieve a desired amount of isolation, a relatively substantial distance is required between the antennas. This distance requirement both increases the cost of the repeater and decreases the aesthetics of the repeater site.

Many existing repeaters use vertically polarized antennas. This approach suffers from various drawbacks including the need to physically space the antennas a relatively large distance apart to achieve an acceptable level of isolation and these systems are highly susceptible to relatively poor performance due to multipath, fading, and other factors. Multipath occurs, for example, when signals reach the same point via different paths.

Additionally, using vertical polarization often causes a relatively significant problem with hand-held antenna tilt. The vertically polarized signal received by the hand-held unit is rarely vertical due to normal transmission fluctuations. The amount of tilt of the hand-held unit varies with the particular operator and the conditions and environments prevailing. Losses from the antenna position and the received signal polarization angle mismatch can be significant (e.g., above 10 dB). Furthermore, vertical polarization is not entirely successful in eliminating interference.

These and other problems can lead to distortion, cancellation, and loss of signal strength.

These and other drawbacks exist in previously known systems.

SUMMARY OF THE INVENTION

One object of the invention is to overcome these and other drawbacks of existing systems.

Another object of the invention is to provide a desired degree of isolation between antennas of a repeater station while allowing the antennas to be positioned relatively close together.

Another object of the invention is to use circularly polarized antennas in a repeater station to enable the repeater station to be smaller, thereby less costly and more aesthetically pleasing.

Another object of the invention is to reduce interference, multipath, and fading problems in wireless communication systems (e.g., cellular or PCS systems).

Another object of the invention is to use a tunnel technology for antennas to reduce side lobes and back lobes and yield a greater front-to-back ratio.

These and other objects of the invention are accomplished, according to one embodiment of the invention, by providing a repeater station in a wireless communications system, where the repeater station includes first and second circularly polarized antennas and the repeater station relays signals from a base station to mobile or fixed subscriber units and from subscriber units to the base station. The first and second antennas are both circularly polarized in the same direction. The use of such circular polarization with the antennas deployed in a back-to-back relationship enables the antennas to be located closer together without compromising the desired amount of isolation between the antennas. This enables the overall "footprint" of the repeater to be relatively smaller thereby reducing cost and improving aesthetics of the repeater station.

According to another aspect of the invention, a "tunnel technology" is used to further improve isolation between the antennas of a repeater. "Tunnel technology" includes providing a tunnel within an antenna and inserting absorber material in the tunnel. The use of this tunnel technology further increases isolation between the antennas by reducing the side lobes and back lobes of an antenna, thereby improving the front-to-back-ratio (i.e., the peak gain in the forward direction vs. the gain at 180 degrees).

BRIEF DESCRIPTION OF THE DRAWINGS

FIG. 4 is a front view of an antenna in accordance with an embodiment of the invention.

FIG. 5 is a side view of an antenna taken along line 4—4 in FIG. 4.

DETAILED DESCRIPTION OF THE PREFERRED EMBODIMENTS

Wireless communication systems transmit signals to and from base stations and subscriber units. These signals may be received and retransmitted using antennas of a repeater station. As signals arc transmitted, other signals and noises are picked up by the transmitted signal which cause interference. This interference distorts the signal from its original state to its received state. One way of minimizing interference is by increasing isolation between the antennas of the repeater station. Isolation is needed to prevent signals transmitted and received by each antenna from interfering with each other. Sufficient isolation must be provided, for example, to ensure that the input signal at the receive antenna does not get amplified and returned with a gain greater than one at all potential phase angles. One way of increasing isolation is by using circular polarization. Circular polarization allows antennas to be placed at a significantly closer distance while maintaining at least the same degree of isolation as antennas in existing systems which are spaced a greater distance. That is, for a given amount of isolation, a pair of antennas may be placed nearer each other than antennas used in existing systems. Therefore, the choice between isolation and separation distance may be optimized. Circular polarization also provides advantages including reducing multipath and fading problems between antennas and overall repeatel station performance.

Another advantage of circular polarization is reduced susceptibility to signal variations due to linear polarization orientations of handouts. Because circular polarization provides a signal which is more efficiently received by a similarly polarized antenna under conditions of multipath and RF interference, less power may be needed to operate the antenna.

Figure 1:
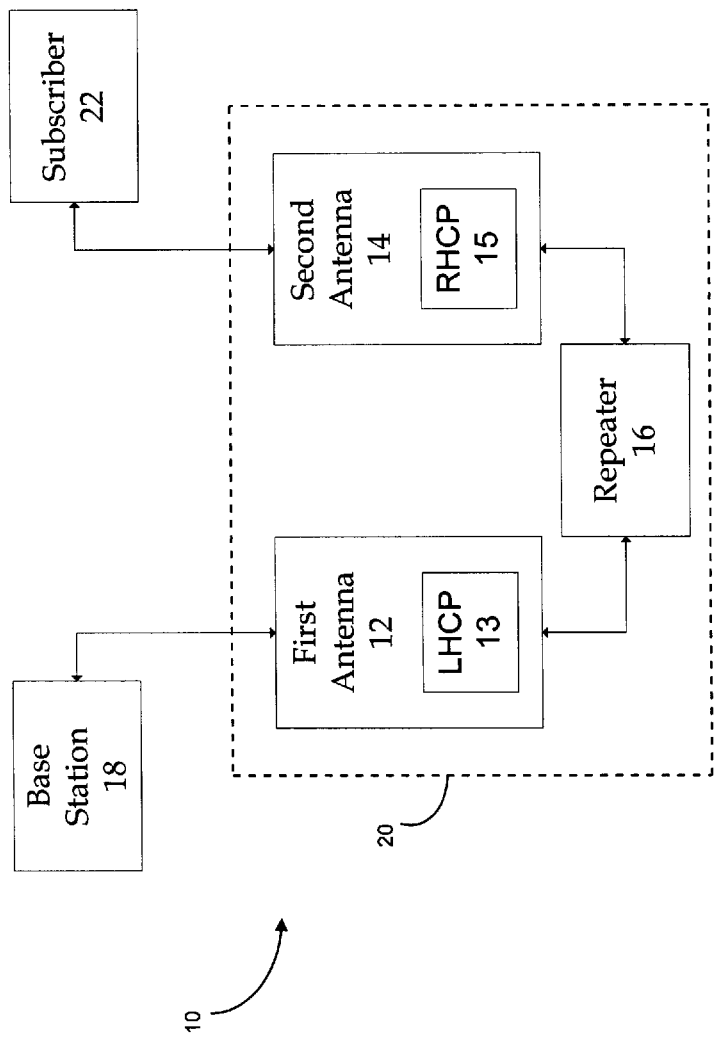
FIG. 1 is a schematic block diagram of an overview of a wireless communications system according to one embodiment of the invention.

FIG. 1 shows a schematic block diagram of a wireless communication system. System 10 comprises a base station 18, repeater station 20, and one or more fixed or mobile subscriber units 22. Repeater station 20 comprises a first antenna 12, a second antenna 14, and a repeater 16. First antenna 12 is left hand circularly polarized (LHCP) 13 and second antenna 14 is right hand circularly polarized (RHCP) 15. First antenna 12 and second antenna 14 are physically spaced apart in a back-to-back relationship. First antenna 12 and second antenna 14 are each circularly polarized in the same direction. Repeater station 20 has many uses for users of wireless communications systems, for example, extending the range of coverage by a wireless service provider. Repeater station 20 relays signals between base station 18 and subscriber 22. For example, base station 18 may transmit a signal to subscriber 22. If subscriber 22 is located at a relatively large distance, the signal received by subscriber 22 may be relatively weak (providing subscriber 22 receives the signal at all). Repeater station 20 may be used to increase the likelihood of the signal reaching subscriber 22 by receiving the signal at some intermediate point, amplifying the signal, and re-transmitting the signal to subscriber 22. For example, a signal may be transmitted from base station 18 to subscriber 22. If subscriber 22 is located at a distance from base station 18 in which the signal may either be received in a weak state or not received, repeater station 20 may be used to increase the possibility of subscriber 22 receiving the signal from base station 18. In this scenario, the signal would be received by first antenna 12. First antenna 12 passes the signal to repeater 16. Repeater 16 filters and amplifies the signal and forwards the signal to second antenna 14. Second antenna 14 then retransmits the signal to subscriber 22.

Because each antenna is polarized in the same direction, the signal is cross-polarized, which cancels any interference picked up by the signal. Similarly, when a signal is being transmitted to base station 18, the signal goes from subscriber 22 to second antenna 14, through repeater 16, and is then transmitted by first antenna 12.

Figure 2:
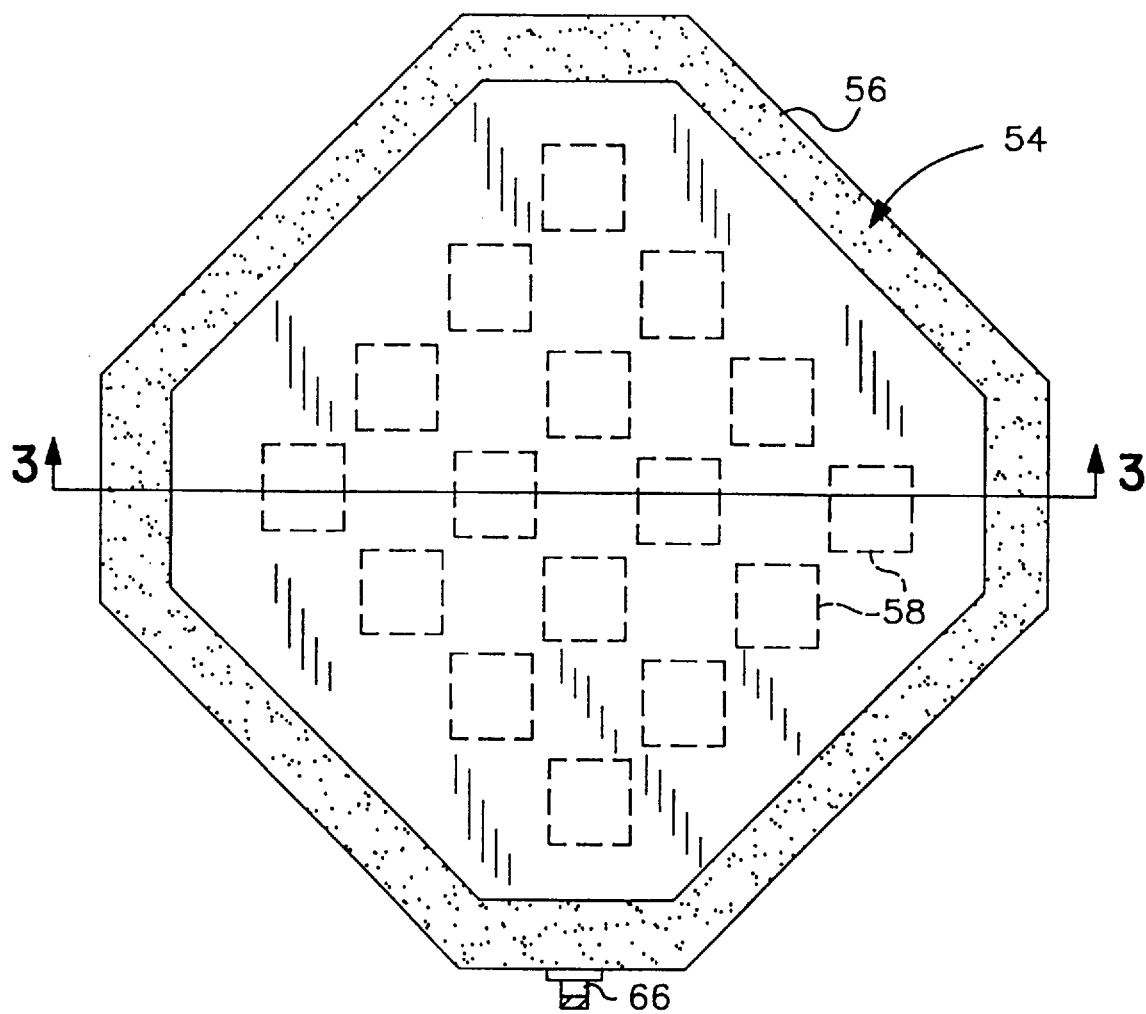
FIG. 2 is a front view of an antenna in accordance with an embodiment of the invention.
Figure 3:
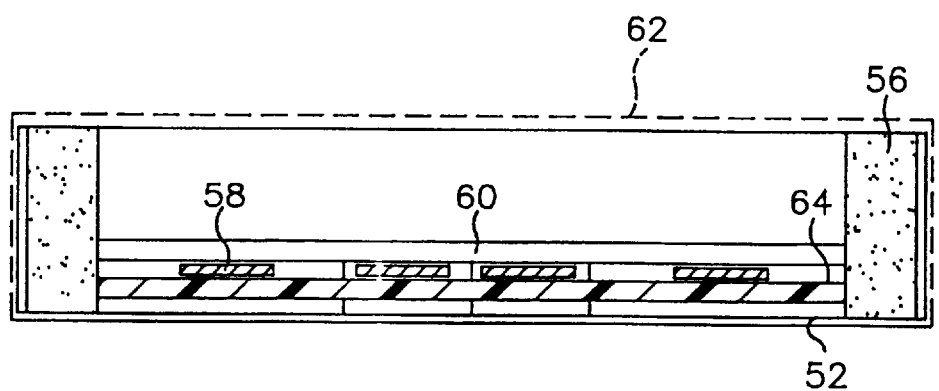
FIG. 3 is a side view of the antenna taken along line 3—3 in FIG. 2.

Embodiment of an antenna according the invention are disclosed in FIGS. 2–4. FIGS. 2–3 show an antenna configuration comprising a chassis 52, a tunnel 54, absorber material 56 located within tunnel 54, patch elements 58, board 60, radome 62, and dielectric board 64. Chassis 52 (preferably made of aluminum although other materials may also be used) forms a recessed portion in first antenna 12 and second antenna 14. Dielectric board 64 (e.g. TEFLON™) is mounted in the recessed portion. Dielectric board 64 has a diameter which is less than the diameter of chassis 52. This structure results in tunnel 54 being formed about the periphery of dielectric board 64. Board 60 (for example, a G10/FR4) is provided with 16 imprinted conductive patch elements 58 (e.g., copper), although more or less patch elements may be used. Board 60 is mounted in the recessed portion such that patch elements 58 are positioned between board 60 and dielectric board 64. Nylon stand-offs may be used to separate board 60 and dielectric board 64. Board 60 is connected to dielectric board 64 through a feed network, which may be inserted through a wire feed-through in board 60. Absorber material 56 (preferably RF absorbing material, although other material may be used) is inserted in tunnel 54 surrounding board 60 and dielectric board 64. Radome 62 encloses the recessed portion. A connector 66 (for example, an N-type connector) may be used for supplying power to first antenna 12 and second antenna 14.

Absorber material 56 is preferably surface impedance matched layered absorber material, although other suitable types of material may be used. The placement of absorber material 56 within tunnel 54 ("tunnel technology") improves isolation by increasing the front-to-back ratio by reducing side and back lobes (which create interference problems) and decreases antenna bandwidth and multipath losses. The front-to-back ratio achieved may range from 12 dB to 90 dB or higher. These problems are decreased using "tunnel technology."

First antenna 12 and second antenna 14 may be used with frequencies in the range of 1850 MHz to 1990 MHz, although other frequencies may also be used. Specifications for an antenna used in this frequency range may include a gain of 18 dBi, a VSWR of 2:1, a power rating of 10 watts CW and an impedance of 50 ohms, although other values may be obtained.

Additionally, first antenna 12 and second antenna 14 may be any shape which will result in a desired beam width pattern (for example, a diamond shape will achieve a 20° beam width pattern). Other patterns may be achieved by selecting an appropriate shape corresponding to a desired pattern. For example, transmitting to a mobile antenna may require a wider beam width pattern, therefore an antenna in the shape of a rectangular may be desired. For communicating with fixed location base stations, a narrower beam width pattern may be sufficient.

Another embodiment of an antenna according to the invention is shown in FIGS. 4–5. Second antenna 14 has a configuration similar to first antenna 12. Chassis 52 forms a recessed portion. Dielectric board 64 is mounted within the recessed portion of chassis 52. Dielectric board 64 has a diameter less than the diameter of chassis 52. This results in a tunnel 54 being formed about the periphery of dielectric board 64. Patch elements 58 are mounted on board 60. Board 60 is connected to dielectric board 64 such that patch elements 58 are positioned between board 60 and dielectric board 64. Absorber material 56 is inserted around dielectric board 64 to isolate second antenna 14. Radome 62 is placed over the recessed portion. Connector 66 allows power to be supplied to second antenna 14.

It will be apparent to those persons skilled in the art that various modifications and alterations may be made without departing from the scope of the invention. For example, other types of polarization may be used, (e.g., left hand circular, slant left, slant right), other types of antenna may be used (e.g., parabolic, helical), the orientation of the patch elements may be altered, etc. The invention is only limited by the claims appended hereto.

What is claimed is:

1. An antenna system for a wireless communications system comprising:

a housing comprising a recessed portion with a predetermined diameter;

a first board located within said recessed portion;

said board having a diameter which is less than said predetermined diameter thereby providing a tunnel located about the periphery of said board;

means for receiving a signal;

said means for receiving mounted on a second board;

said second board having a diameter which is less than said predetermined diameter;

absorber material inserted into said tunnel.

2. The antenna system of claim 1 further comprising a means for enclosing said recessed portion.

3. The antenna system of claim 1 wherein said means for receiving a signal is circularly polarized.

4. The antenna system of claim 1 wherein said absorber material is surface impedance matched layered absorber material.

* * * * *